United States Patent [19]

Weeks

[11] 4,168,864
[45] Sep. 25, 1979

[54] APPARATUS FOR CONVEYING PARTICULATE MATTER

[75] Inventor: Wyatt J. Weeks, Everett, Wash.

[73] Assignee: Air Konvey Company, Seattle, Wash.

[21] Appl. No.: 858,686

[22] Filed: Dec. 8, 1977

Related U.S. Application Data

[63] Continuation of Ser. No. 551,529, Feb. 21, 1975, abandoned, which is a continuation-in-part of Ser. No. 381,269, Jul. 20, 1973, abandoned.

[51] Int. Cl.² .................................................. B65G 53/28
[52] U.S. Cl. ........................................ 406/23; 406/109
[58] Field of Search ............... 141/28; 302/3, 21, 35, 302/53, 54, 55, 57, 58

[56] References Cited

U.S. PATENT DOCUMENTS

| | | | |
|---|---|---|---|
| 2,924,489 | 2/1960 | Beckman | 302/53 |
| 3,620,575 | 11/1971 | McIver | 302/53 |

FOREIGN PATENT DOCUMENTS

| | | | |
|---|---|---|---|
| 793769 | 4/1958 | United Kingdom | 302/53 |

*Primary Examiner*—Robert B. Reeves
*Assistant Examiner*—Jeffrey V. Nase
*Attorney, Agent, or Firm*—Seed, Berry, Vernon & Baynham

[57] ABSTRACT

A stationary or portable conveying system for conveying particulate dry products is disclosed. The conveying apparatus is 100% air operated, with few moving parts, and requires no electric controls, no rotary valves and no timers. The apparatus disclosed includes a storage vessel provided with product intake and discharge openings. The valving associated with the storage vessel automatically operates alternately to admit product to the storage vessel during an intake cycle and, when the storage vessel is full, to automatically shift to a discharge cycle to unload the product from the storage vessel. A valve mounted to the vessel near the top detects the level of product in the vessel. The valve includes a generally cylindrical body having a central bore communicating with a plurality of ports. A longitudinally displaceable valve stem is mounted in the bore and is spring biased to project beyond one end of the valve body. A plurality of poppet valves, which control communication between the ports, are formed in the valve stem. The poppet valves are actuated by inwardly displacing the valve stem. For this purpose, an L-shaped lever, pivotally mounted to the valve body adjacent the end of the stem, is displaced by product reaching the level of the lever, thereby longitudinally displacing the stem and actuating the poppet valves. The valve returns to its spring-biased position when the product level falls below the level of the lever.

9 Claims, 4 Drawing Figures

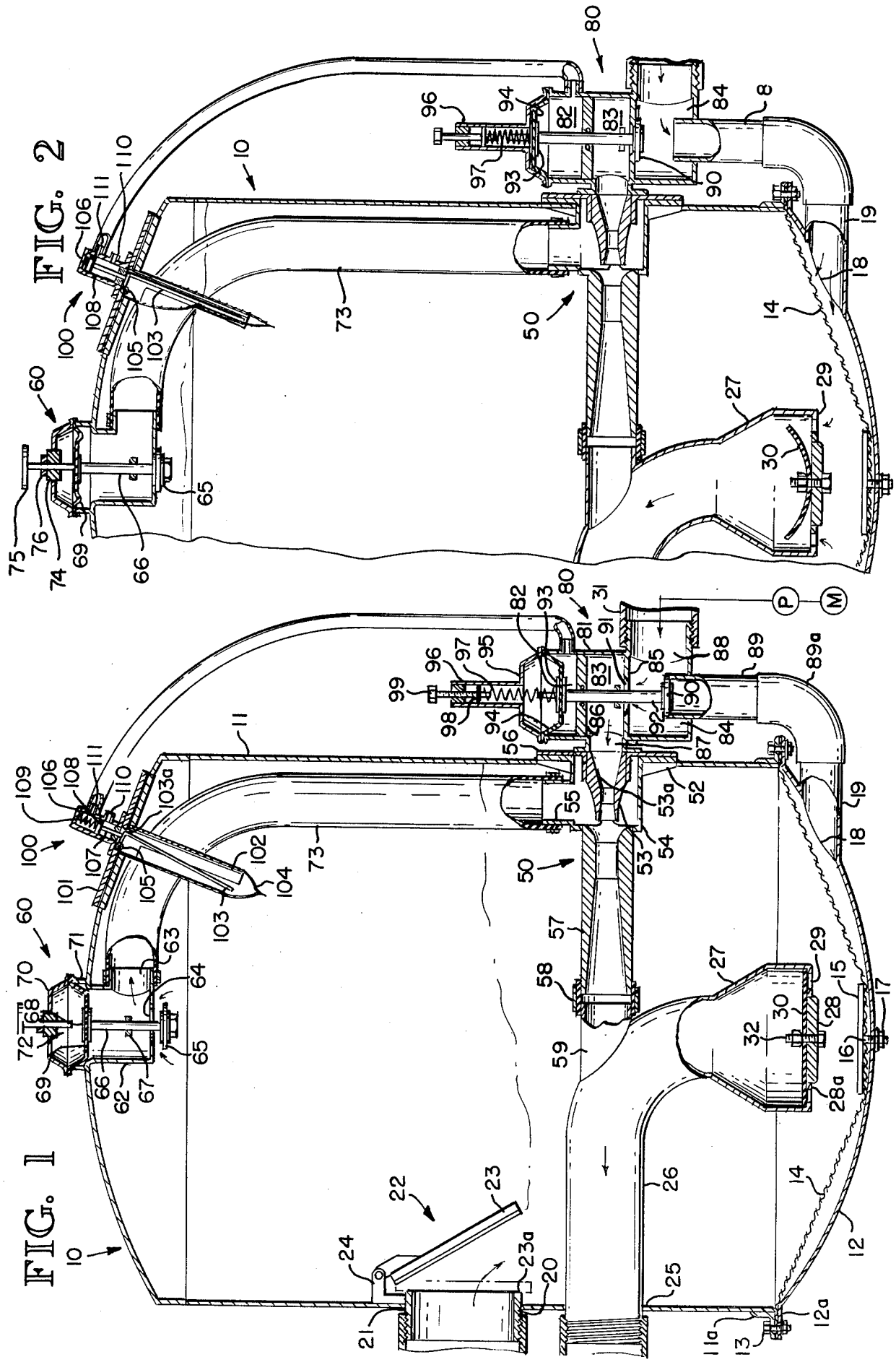

APPARATUS FOR CONVEYING PARTICULATE MATTER

This is a continuation of application Ser. No. 551,529, filed Feb. 21, 1975, now abandoned, which is a continuation-in-part of the application Ser. No. 381,269, filed July 20, 1973, now abandoned.

BACKGROUND OF THE INVENTION

1. Field of the Invention

This invention relates to an apparatus for unloading a particulate product from one location and conveying it to a second location intermittently, solely with a pressurized fluid.

2. Description of the Prior Art

Particulate dry products, such as barite, cement, bentonite and other such materials, are generally shipped by truck or rail to a use location at which point they must be unloaded into either bulk containers or smaller containers for transport to the site desired. Conveying apparatus which has been developed for such use has required electric controls or mechanical valving, which, not being maintenance-free, has caused much delay due to malfunction. For example, see U.S. Pat. Nos. 3,372,958 and 3,391,963. It is particularly advantageous to utilize a system for unloading which is maintenance-free when being used in isolated locations far from any source of repair.

SUMMARY OF THE INVENTION

This invention has for its primary object providing a stationary or portable vacuum-pressure conveyor which is completely automatic, i.e., it requires no valve operators, no electric controls, no rotary valves, no timers. The vacuum-pressure conveyor operates solely by a pressurized fluid and utilizes few moving parts. The apparatus comprises a substantially closed storage vessel having product discharge and intake openings with means for intermittently loading a dry particulate product into the storage vessel using negative pressure within the vessel to assist in the loading and then discharging the particulate product from the vessel with the application of positive pressure within the vessel. Valve means control introduction of pressurized air through a venturi throat to generate a negative pressure within the vessel to assist in loading the particulate product into the vessel. When the particulate product has substantially filled the storage vessel, the pressure of the product against the control means shifts the valve means to aerate the product and generate a positive pressure within the vessel to unload the particulate product contained therein. The control means include a lever mechanism extending into the interior of the vessel which is responsive to the pressure of the product pressing thereagainst. The lever mechanism actuates a longitudinally displaceable valve stem axially mounted in the bore of a generally cylindrical valve body. A plurality of poppet valves are formed in the valve stem for allowing communication between one pair of ports when the stem is depressed inwardly and another pair of ports when the stem is extended. A product-impervious covering surrounds the lever mechanism to prevent buildup of particulate product within the lever mechanism.

The primary objects of this invention are to provide: (1) an apparatus for effectively and intermittently conveying particulate dry products from a storage location to a desired end use location; (2) a conveying system having a unique control means for effectively switching the apparatus between a loading cycle and a discharge cycle; (3) a conveying apparatus having a venturi of a particular design for effective use at low air pressures; (4) a conveying system which is low in cost and substantially maintenance-free due to the elimination of electric controls, rotary valves, timers and filters; (5) a conveying system which is completely automatic, dust-free and weathertight; and (6) a pilot valve actuated in one direction when a lever detects a product level above a predetermined value and in the other direction when the pressure at one of the valve ports is less than a predetermined value.

BRIEF DESCRIPTION OF THE DRAWINGS

FIG. 1 is a vertical cross-sectional view of the apparatus, illustrating the loading cycle.

FIG. 2 is the same as FIG. 1, illustrating the discharge cycle.

DETAILED DESCRIPTION OF THE INVENTION

Figure 3:
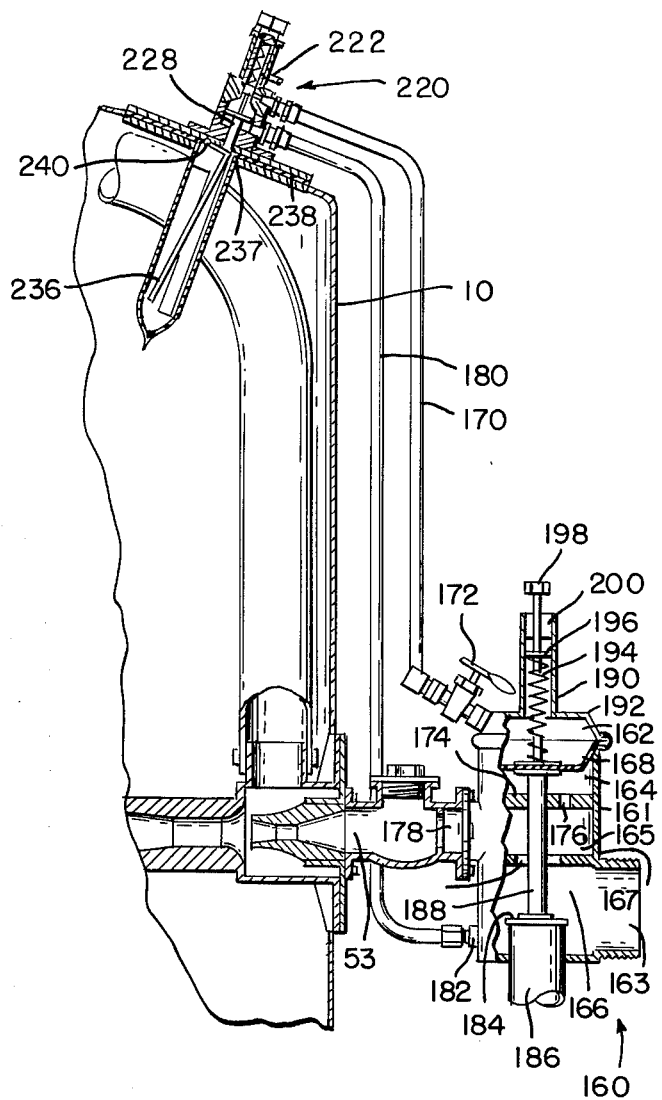
FIG. 3 is a partial cross-sectional view of an alternative embodiment of the invention.

Referring to FIG. 1, the conveying apparatus includes a storage vessel 10 having an upper domed section 11 and a lower section 12. A flange 11a is secured around the outer edge of the section 11 which mates with flange 12a of section 12. The two sections are secured together by retaining means 13 at spaced intervals. An air-permeable diaphragm 14 is mounted in the vessel 10. The outer periphery of the diaphragm is secured between flanges 11a and 12a by the retaining means 13 and is secured at its midpoint at the midline of the lower section 2 by plate 15 having a bolt 16 extending therefrom secured to the bottom of the vessel section 12 by nut 17.

An opening 18 in the lower section 12 is fitted with an air conduit 19 for supplying pressurized air into the interior of the vessel through the air-permeable flexible diaphragm 14. The air-permeable diaphragm may be made of a material such as heavy canvas.

The upper vessel section 11 of the storage vessel includes a material inlet opening 22 in the sidewall 20 fitted with a threaded insert 21 to which a product supply conduit (not shown) is connected. The insert 21 terminates just inside the shell of the upper section 11 and is covered with a hinged control valve 23 which opens and closes responsive to pressure variations in the interior of the vessel. When the pressure in the interior of the vessel is less than atmospheric, the valve 23 opens to allow product to enter the vessel. When the pressure in the vessel exceeds atmospheric, the valve 23 closes. The valve 23 includes a valve member formed to seat against the edge 23a of the insert 21 when the valve is closed. The valve member is hinged at its upper end to a support 24 secured to the inner vessel wall. A stop (not shown) limits the travel of the valve member to a swing angle of 90° or less.

The upper vessel section 11 also includes a product outlet opening 25 through which a product outlet conduit 26 extends. The product outlet conduit extends into the interior of the storage vessel to about its midpoint and turns downwardly at a right angle ending in a bell-shaped member 27. The open end of the bell-shaped member 27 has a support 28 mounted therein secured to the side walls of the bell-shaped member 27 by legs 28a, leaving ports 29 therein at spaced intervals about the circumference thereof. A flexible flap valve 30 is secured through its center to the center of the support 28 by suitable retaining means 32. The valve member 30 is illustrated in closed position in FIG. 1 and covers the ports 29 to prevent any discharge of product out conduit 26.

A source of pressurized fluid, such as air, is intermittently supplied to the interior of the vessel. The fluid is delivered through conduit 31 and valve 80 (which will be described in detail later). The valve 80 serves to (1) initially channel the supply air through a venturi assembly 50 (to be described) to impose a negative pressure in the interior of the vessel 10 and then (2) to supply air through conduit 19 and air-permeable diaphragm 14 to impose above-atmospheric pressure within the vessel to discharge product contained in the vessel through the discharge conduit 26.

The venturi assembly 50 is removably secured in the interior of the vessel to an insert 52 secured in the vessel sidewall and held in place in the vessel wall by suitable retaining means (not shown). The venturi assembly includes a nozzle 53 whose interior 53a is tapered in diameter longitudinally from the intake end thereof and from the discharge end thereof to provide a venturi configuration. The venturi nozzle 53 is surrounded by a housing 54 having a lateral port 55 in one sidewall. The housing is secured to a plate 56 secured to the insert 52 in the vessel wall. A second, elongated venturi nozzle 57 is mounted adjacent the discharge end of venturi nozzle 53 so that the intake and discharge ends of both venturis are in axial alignment. The venturi nozzle 57 is of greater interior diameter than the venturi nozzle 53 and is positioned relative to nozzle 53 so that when pressurized air is directed through nozzles 53 and 57, an aspirating action or suction is created, pulling air through port 55. The discharge end of the venturi nozzle 57 is connected to conduit 59 by a removable flexible sleeve 58. Conduit 59 is coupled into the product outlet conduit 26.

Valve assembly 60 is designed to prevent passage of air through venturi 57 during the discharge cycle. The valve assembly is mounted through an opening in the top of the vessel section 11. The valve assembly 60 includes a valve body 62 extending down into the interior of the vessel, the valve body including a lateral port 63 and an annular valve opening 64 in the bottom wall. A circular poppet valve member 65 seats against the marginal edges of the valve opening 64. The valve member 65 is secured to the lower end of the valve stem 66 which extends axially through sleeve 67 and is connected by washer 68 at its opposite end to a flexible diaphragm 69. The diaphragm 69 is supported at its terminal edges between members 70 and 71 which form a chamber 72 open to atmospheric pressure. Port 63 of valve assembly 60 and port 55 of the venturi assembly are connected by a flexible conduit 73. At times it may be desirable to allow air through conduit 73 and venturi 57 to increase the ratio of air to product being discharged. This is particularly true if the product being conveyed tends to plug the discharge line connected to the discharge conduit 26. To control the amount of bypass air through valve 60 during the discharge cycle, a bolt 75 is threaded in a boss 74 secured to member 70 to restrain the movement of washers 68 and prevent the valve member 65 from completely closing the valve opening 64. Bolt 75 may be adjusted to increase or decrease the amount of bypass air.

A second valve assembly 80 operates to alternately supply pressurized air through the venturi assembly 50 and into the interior of the storage vessel 10 through diaphragm 69 and includes a main valve body 81 separated into three chambers 82, 83 an 84 by barriers 85 and 86. The central chamber 83 of the valve body includes a lateral port 87 connected to the intake end of venturi nozzle 53. Lower chamber 84 includes a lateral port 88 connected to conduit 31 and the source of pressurized air. Conduit 89 extends through an opening in the bottom wall of the lower chamber 84 of the valve member as illustrated in FIG. 1 and connects, by means of flexible line 89a, with conduit 19 to supply pressurized air to the interior of the storage vessel through flexible diaphragm 14. A circular poppet valve member 90 seats, in a first position, on the terminating end of conduit 89, preventing airflow through conduit 89 to the interior of the vessel 10. When the valve member 90 is in the first position, pressurized air is directed through valve opening 91 in barrier plate 85 and through the venturi nozzle assembly 50. The valve member 90 is secured to valve stem 92 at one end, extending centrally into the valve body 81 and through an opening in barrier 86. The stem, at its opposite end, is connected by washers 93 to a flexible diaphragm 94. The diaphragm 94 is supported around its outer periphery between the upper terminating flanges of valve body 81 and member 95. The member 95 has an upstanding central housing 96 holding an adjustable spring 97 biased at one end against washers 93 and at the opposite end against washer 98 connected to an adjusting bolt 99 threaded into an insert in the end of housing 96. The valve member 90 is movable between a first position, as described, to supply air through the venturi assembly and a second position wherein the valve member 90 seats against the valve opening 91, preventing flow of pressurized air through the venturi assembly and supplying pressurized air to the interior of the storage vessel through diaphragm 14.

The valve assembly 100 controls shifting of the valve member 90 of valve assembly 80 from a first position to a second position responsive to product pressure against a hinged lever mechanism. The valve assembly 100 includes a plate 101 secured to an insert in an opening in the top of the vessel wall to which is attached an elongated, arcuate rigid strip 102 which extends into the interior of the vessel 10. An elongated, flat rigid lever of L-shaped configuration 103, having a width less than the diameter of member 102, is hingedly mounted at 105 to swing between the positions illustrated in FIGS. 1 and 2 responsive to product pressure against the lever 103. The lever 103 and member 102 are covered with a flexible, air-permeable, product-impervious cover 104 as illustrated, the cover secured between plate 101 and the insert in the vessel wall 11 by suitable means. The base 103a of the L-shaped lever contacts the valve stem 107 of a spring-biased poppet valve mechanism. The valve mechanism includes a valve body 106 secured to plate 101. A valve member 108, slidably mounted in the bore of the valve body 106, is connected to the valve stem 107 which extends through the end wall of the valve body into contact with lever 103. A spring 109 biases the valve member to the position shown in FIG. 1. The valve body includes two ports 110 and 111. Port 110 connects with the source of pressurized air. Pot 111 is connected to chamber 82 of valve 80 by a conduit. In the position illustrated by FIG. 1, pressurized air is prevented from entering port 111 and chamber 82. As product is loaded into the storage vessel 10, it reaches a level such that the product exerts pressure against the lever 103. The lever 103 is forced downwardly by the product pressure to move valve member 108 to a second position, illustrated by FIG. 2, allowing pressurized air through port 111 into chamber 82 to shift valve member 90 from the first position, shown in FIG. 1, to the second position, shown in FIG. 2, allowing pressurized air through conduit 19 and flexible diaphragm 14 to pressurize the interior of the storage vessel, aerate the product therein and discharge the product through conduit 26. The cover 104 for the lever mechanism must be impervious to the product being loaded into the chamber to prevent material buildup between the lever 103 and the member 102, such buildup preventing effective working of the mechanism. The cover should also be air-permeable so that pressure variations in the storage vessel do not effect the operation of the lever mechanism.

Another embodiment of the present invention, using an alternative valve and control means, is shown in FIG. 3. The valve assembly 160 is provided for the same purpose as valve assembly 80 in FIGS. 1 and 2. The valve body 161 is separated into four chambers, 162, 164, 165 and 166. Chambers 162 and 164 are separated by a flexible diaphragm 168. Chamber 162 communicates with an air hose 170 through valve 172, which, in normal operation, is in its open position. The chamber 164 is separated from the chamber 166 by a barrier 174 having a through bore 176 for allowing communication between chambers 164 and 165. The chamber 165 includes a lateral port 178 connected to the intake end of the venturi nozzle 53. The chamber 165 is separated from the lower chamber 166 by a barrier 167 containing an aperture 169. Pressurized air is supplied to the lower chamber 166 through port 163. A second air line 180 is also connected to the lower chamber 166 at port 182. A circular poppet member 184 seats, in a first position, on the terminating end of conduit 186, preventing airflow through conduit 186 to the interior of the vessel 10. The member 184 seats, in a second position, against the marginal edges of aperture 169, thereby preventing airflow into the venturi nozzle 53. The valve member 184 is secured to the lower end of a valve stem 188. The valve stem 188 extends upwardly through barriers 167, 174, and is secured to diaphragm 168 such that axial movement of the diaphragm causes an identical movement of the valve stem 188. The valve stem 188 is biased downwardly by compression spring 194, contacting the diaphragm 168 at its lower end and a stop 196 at its upper end. The position of the stop 196 is adjustable by rotating adjusting screw 198 in the threaded cap 200 covering the upstanding central housing 190 of cover member 192.

In operation, both air lines 170, 180 are connected together during the fill cycle. Since the pressure in chamber 162 is then equal to the pressure in chambers 164 and 166, the net force on the diaphragm 168 is zero. The spring 194 thus biases the valve member 184 against the terminating end of conduit 186, allowing air entering 163 to flow into the venturi intake 53. As will be explained hereinafter, when the product in the vessel reaches a predetermined level, air line 170 is vented to the atmosphere. Since the pressure in chamber 164 is then greater than the pressure in chamber 162, a net upward force is exerted on the valve stem 188 by the diaphragm 168. The valve member 184 then unseats from the terminating end of the conduit 186 and seats against the marginal edges of aperture 169, diverting the airflow through supply line 163 from the nozzle opening 53 to conduit 186. At the conclusion of the discharge cycle, the air supply line 170 is once again connected to the air line 180, thereby allowing the spring 194 to seat the valve member 184 against the terminating end of the conduit 186 and unseat the valve member 184 from the aperture 169. The pressure differential between chambers 162 and 164 at which the valve member 184 will unseat from the terminating end of conduit 186 is determined by the bias force exerted by the spring 194. This can be adjusted by rotating the adjusting screw 198, thereby adjusting the downward force exerted on the valve stem 188 by the spring 194. The shutoff valve 172 is provided to allow switching to the discharge cycle at any time by manually actuating the valve 172 and venting chamber 162 to atmosphere.

Figure 4:
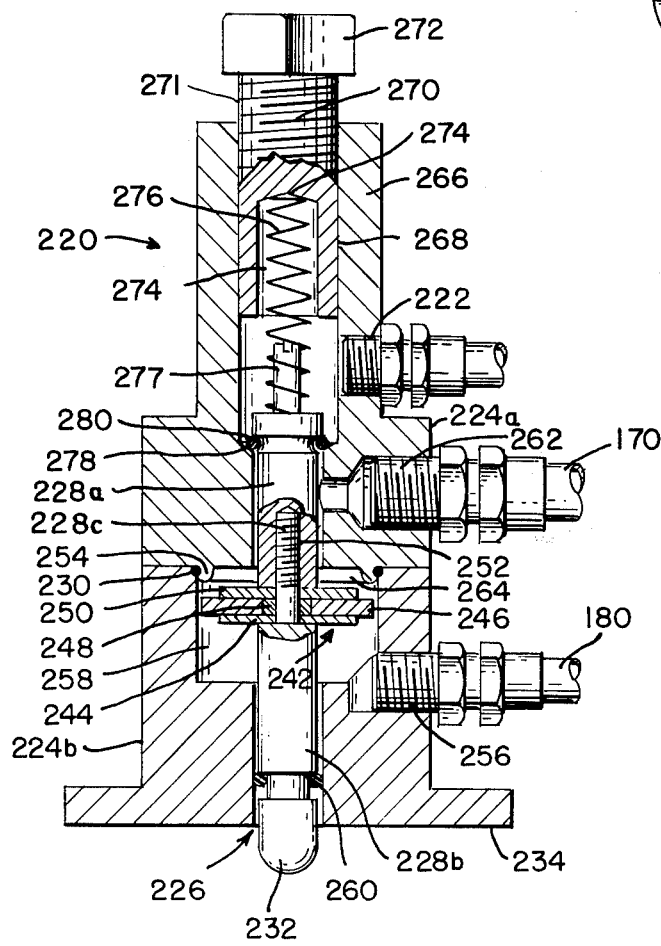
FIG. 4 is a cross-sectional view showing the construction details of the product level detection valve.

The pressure in air line 170 is controlled by a pilot valve assembly 220. The pilot valve assembly 220 functions in a manner similar to the valve assembly 100 in FIGS. 1 and 2 except that upon actuation (when the product level reaches the lever of the valve assembly), the air line 170, which is normally connected to air line 180, is disconnected therefrom and connected to a port 222 communicating with the atmosphere. The construction details of the valve assembly are shown in FIG. 4. The valve assembly 220 includes a generally cylindrical valve body 224 formed in two sections 224a, 224b. The body 224 has a central bore 226 for receiving a valve stem 228. The valve body 224 comprises two sections, 224a, 224b joined together by a reduced diameter third section 224c. An O-ring 230 is placed between the two sections 224a, 224b for preventing airflow therethrough. One end of 232 of the valve stem 228 projects beyond the flush face 234 of the valve body 224b. As shown in FIG. 3, the lever 236 is pivotally mounted to the plate 238 by pin 240, with the bend 237 in the lever 236 abutting the end 232 of the valve stem 228. Thus, angular movement of the lever 236 depresses the valve stem 228 inwardly. The valve stem 228 is composed of an inner section 228a and an outer section 228b. A poppet valve 242 is placed between the inner and outer sections 228a, b. The poppet valve 242 is formed by inserting a threaded projection 228c, integrally formed from the lower portion of the valve stem 228b, through a washer 244, a valve seating member 246 surrounding a spacer 248 and a second washer 250. The upper portion of the valve stem 228a, having an axial bore 252 containing internal threads, is torqued onto the threaded projection 228c, thereby rigidly securing the poppet valve 242 to the valve stem 228. A valve seat 254 is integrally formed in the valve body 224a and is adapted to abut the valve seating member 246 when the valve stem 228 is depressed inwardly. A fluid port 256 communicates with a chamber 258 formed by the central bore 226 in the valve body 224 which is sealed by the valve seating member 246 and the valve seat 254 at one end and an O-ring 260 at the other end. A second fluid port 262 communicates with a second chamber 264 on the other side of the valve 242. When the valve stem 228 is in its extended position, the chamber 264 communicates with the chamber 258, thereby allowing fluid communication between ports 256 and 262. However, when the valve stem 228 is depressed inwardly, the valve member 246 seats against the valve seat 254, preventing fluid communication between the ports 262 and 256.

The top section of the valve body 224a forms an elongated cylindrical housing 266 having internal threads 268 in its central bore. An adjustment screw 270, having threads 271 adapted to fit the threads 268, is inserted into the bore 226. The adjusting screw 270 contains a central bore 274 which receives a compression spring 276 which fits over a projection 277 from the top section of the valve stem 228a to abut the top surface of the valve stem 228 and urge it outwardly. A lip 278 is formed in the valve body 224a which abuts an O-ring 280 surrounding the valve stem 228a when the valve stem 228 is in its extended position. The lip 278 and O-ring 280 prevent fluid communication between ports 222 and 262 when the stem 228 is in its extended position. However, when the stem 228 is depressed inwardly, port 262 is disconnected from port 256 and connected to port 222.

In operation, valve stem 228 is depressed inwardly by the lever 236 when the product in vessel 10 reaches a predetermined value. Port 262, which is connected to chamber 162 of valve assembly 160 through air line 170, is then disconnected from the pressurized fluid port 256 and vented to atmosphere through port 222. Fluid port 256, which is connected to the chamber 166 of the valve assembly 160 by air line 180, maintains a relatively high pressure in the chamber 258, thereby holding the valve seating member 246 against the valve seat 254, opposing the outward forces provided by the compression spring 276. At the end of the discharge cycle, the pressure in chamber 166 is reduced, thereby reducing the pressure in the chamber 258 and allowing the compression spring 276 to extend the valve stem 228 and once again connect the port 262 to port 256 and disconnect it from the port 222. The pressure in the chamber 258 at which the poppet valve 242 opens is a function of the outward force exerted on the valve stem 228 by the compression spring 276. By rotating the knurled end 272 of the adjusting screw 270, the distance between the adjusting screw 270 and the valve stem 228 is changed, thereby changing the outward bias exerted by the spring 276.

OPERATION

The operation of the conveying apparatus shown as a preferred embodiment in FIG. 1 is as follows:

A source of pressurized air at 10 to 30 or more psi is directed through conduit 31 through the venturi assembly 50 with the valve member 90 in the position indicated in FIG. 1. As the pressurized air courses through the venturi assembly, an aspirating action occurs which generates a negative air pressure in vessel 10 by drawing air through port 55 and conduit 73. The generated negative pressure causes valve member 64 of valve assembly 60 to shift to the position illustrated in FIG. 1, allowing air to be sucked from the interior of the storage vessel. The generated negative pressure within the storage vessel 10 causes flap valve 30 to close and hinged valve 23 to open. The product to be loaded into the storage vessel flows into the interior of the vessel through the product intake 22 until the product builds up to a level sufficient to contact the lever 103. When the pressure of the product against lever 103 is sufficient to press lever 103 from the position illustrated in FIG. 2, valve member 106 shifts, allowing pressurized air to enter compartment 82 and shift the valve member 90 from the position illustrated in FIG. 1 to the position illustrated in FIG. 2. This allows pressurized air to flow through conduits 89 and 19 into the interior of vessel 10 where it diffuses through the flexible diaphragm 14 to aerate the product contained therein, increase the pressure in the interior of the vessel above atmospheric, and discharge the aerated material out of the storage vessel 10 through flap valve 30 and product conduit 26. As the level of the product in the storage vessel drops below lever 103, the spring 109, acting against valve member 108, moves the valve member back to the first position and forces the lever back to its initial position. Valve member 90, however, remains in the second position because of the pressurized air acting against its underside and holding it against the valve opening 91 until the product in the vessel is emptied, at which time a pressure drop occurs. Spring 97 is adjusted so that when such a pressure drop occurs, it seats the valve member 90 over conduit 89, allowing pressurized air to again flow through the venturi assembly 50 and begin a subsequent loading cycle.

The unit is capable of operating effectively at pressure as low as 10 psi utilizing the particular nozzle-venturi illustrated. Nozzle 53 has an overall length of 4 inches, a straight bore ⅞ inch × ⅞ inch, a ⅞ inch long diverging section at the discharge end diverging from the straight bore at an angle of 15°, and a 2¼ inch long intake section diverging from the straight bore at an angle of about 30°. Venturi 57 has an O.D. of 2½ inches and an overall length of 9¼ inches. At the intake end, the inner radius narrows from 2½ inches to the venturi throat, having a 1⅜ inch I.D. and a length of 2 inches. The discharge end of the venturi diverges from the throat at an angle of less than 10°.

The embodiments of the invention in which a particular property or privilege is claimed are defined as follows:

1. A conveying apparatus for alternately loading a dry particulate product into a storage vessel using nagative pressure within the vessel to assist in loading the particulate product into the vessel and then discharging the particulate product from the vessel with the application of positive pressure within the vessel, comprising:
    a substantially closed storage vessel having product intake and discharge openings;
    means for generating negative pressure within the storage vessel during a loading cycle;
    means for supplying pressurized fluid to the storage vessel during a discharge cycle;
    valve means, including a fluid control port, controlling introduction of the pressurized fluid into the storage vessel shifting between a first position wherein negative pressure is generated within the vessel to assist in loading the particulate product and a second position wherein positive pressure is generated within the vessel for discharging the particulate product, said valve means being actuated from said first position to said second position responsive to a change in the fluid pressure in the fluid control port; and
    a fluid control valve having an outlet port communicating with the fluid control port of said valve means, said fluid valve further including a control element actuated responsive to loading of a predetermined amount of product into the vessel to vary the fluid pressure at said outlet port thereby shifting said valve means from the first position to the second position.

2. The apparatus of claim 1 wherein said fluid control valve includes a lever operatively connected to said control element and extending into the interior of the vessel for shifting said valve means responsvie to product pressure within the vessel against the lever, and a fluid-permeable, product-impervious cover surrounding the lever.

3. The apparatus of claim 1 wherein the means for inducing negative pressure within the storage vessel is a venturi assembly communicating with the discharge opening of the vessel, including (1) a venturi providing a path of restricted fluid flow therethrough having an inlet connected to the pressurized fluid through the first valve means and an outlet communicating with the discharge opening of the vessel, (2) an aspirator opening in the venturi, and (3) second valve means communicating with the aspirator opening and the interior of the vessel shifting responsive to the negative pressure generated by flow of fluid through the venturi in the loading cycle to allow suction of fluid from the interior of the vessel through the venturi and shifting responsive to positive pressure in the vessel during the discharge cycle to prevent passage of fluid through the venturi.

4. The apparatus of claim 3 wherein the first valve means is spring biased in the first position allowing pressurized fluid to flow through the venturi asembly, wherein shifting of the fluid control valve responsive to loading of the vessel with product shifts the first valve means to the second position allowing pressurized fluid to flow into said vessel to fluidize the product contained in the storage vessel and discharge it through a discharge opening of the vessel, and wherein a pressure drop in the vessel occurring on discharge of the product contained therein affects shift of the first valve means back to the first position.

5. The apparatus of claim 1, including a fluid-permeable, flexible diaphragm mounted within the vessel having its outer periphery anchored around the sides of the storage vessel for diffusing pressurized fluid entering the vessel to fluidize and assist in the discharge of the particulate product from the vessel and conduit means connected to the source of pressurized fluid through the first valve means for supplying fluid through the diaphragm.

6. A conveying apparatus for alternately loading a dry particulate product into a storage vessel using negative pressure within the vessel to assist in loading the particulate product into the vessel and then discharging the particulate product from the vessel with the application of positive pressure within the vessel, comprising:
a substantially closed storage vessel having product intake and discharge openings;
a valve covering the product intake opening, said valve opening to admit product when the pressure in the vessel is below atmospheric and closing when the pressure in the vessel is greater than atmospheric;
a product discharge conduit communicating with the discharge opening in the vessel and extending into the interior of the vessel;
a valve covering the product discharge conduit, said valve closing to prevent discharge of product from the vessel during loading thereof when the presure in the vessel is below atmospheric and opening to discharge product from the vessel when the pressure in the vessel is greater than atmospheric;
a venturi coupled into the product discharge conduit providing a path of restricted fluid flow therethrough and having an aspirator opening therein communicating with the interior of the vessel for generating a negative pressure in the vessel when pressurized fluid is forced through the venturi;
means for supplying pressurized fluid to the storage vessel and venturi;
first valve means controlling introduction of the pressurized fluid into the storage vessel shifting between a first position for discharge of the fluid through the venturi to generate a negative pressure in the vessel and a second position for discharge of fluid into the vessel to generate a positive pressure therein for discharge of the particulate product;
second valve means operative to cause the first valve means to shift between the first and second positions;
a lever operatively connected to the second valve means and extending into the intterior of the vessel for shifting the second valve means responsive to product pressure within the vessel against the lever;
a fluid-permeable, product-impervious cover surrounding the lever;
a conduit connected to the source of pressurized fluid and interior of the vessel through the first valve means;
a fluid-permeable, flexible diaphragm mounted within the vessel having its outer periphery anchored around the sides of the vessel for diffusing the pressurized fluid entering the vessel through the conduit to fluidize the particulate product therein and raise the interior pressure in the vessel to discharge the product therein through the valve and product discharge conduit; and
third valve means communicating with the aspirator opening and the interior of the vessel responsive to the negative pressure generated by flow of fluid through the venturi to suck fluid from the interior of the vessel during loading of the product and preventing fluid flow through the aspirator opening during discharge of the product.

7. A conveying apparatus for alternately loading a dry particulate product into a storage vessel using negative pressure within the vessel to assist in loading the particulate product into the vessel and then discharging the particulate product from the vessel with the application of positive pressure within the vessel, comprising:
a substantially closed storage vessel having product intake and discharge openings and a pressurized fluid inlet port;
an aspirator having a suction conduit opening into the interior of the storage vessel, a venturi intake port and a venturi discharge port communicating through a conduit with the exterior of the storage vessel whereby a negative pressure is generated in the vessel when pressurized fluid is forced through the aspirator;
first valve means shifting between a first position wherein the fluid inlet port communicates with the venturi intake port of the aspirator for generating a negative pressure within the vessel and a second position wherein the fluid inlet port communicates with the interior of the vessel for generating a positive pressure within the vessel; and
control means operatively connected to the first valve means for shifting said first valve means between the first and second positions responsive to loading of a predetermined amount of product into the vessel.

8. The apparatus of claim 7 wherein the first valve means includes a fluid control port and means responsive to the receipt of pressurized fluid at the control port for shifting the valve means between the first and second positions and wherein the control means includes a second valve means for changing the pressure of fluid in the fluid control port when a predetermined amount of product has been loaded into the vessel whereby the interior of the vessel will receive a positive pressure for discharging the particulate product when a predetermined quantity of product has been loaded into the vessel.

9. The apparatus of claim 7 wherein the first valve means remains in its second position until a pressure drop occurring within the vessel on discharge of the product contained therein allows the first valve means to shift back to the first position.

* * * * *